United States Patent
Hashimoto et al.

(10) Patent No.: US 12,503,104 B2
(45) Date of Patent: Dec. 23, 2025

(54) CONTROL DEVICE, CONTROL METHOD, AND STORAGE MEDIUM

(71) Applicant: TOYOTA JIDOSHA KABUSHIKI KAISHA, Toyota (JP)

(72) Inventors: Sho Hashimoto, Susono (JP); Noriaki Hasegawa, Izunokuni (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 246 days.

(21) Appl. No.: 18/451,529

(22) Filed: Aug. 17, 2023

(65) Prior Publication Data

US 2024/0149869 A1    May 9, 2024

(30) Foreign Application Priority Data

Nov. 8, 2022 (JP) .................................. 2022-179027

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 40/08* (2013.01); *B60W 60/0015* (2020.02)

(58) Field of Classification Search
CPC ............. B60W 30/09; B60W 30/0956; B60W 2420/403; B60W 2420/408; B60W 2554/402; B60W 2554/80; B60W 2554/404; B60W 2556/20; B60W 30/18154; B60W 50/14; B60W 30/0953; G01S 13/931; G01S 13/867;
(Continued)

(56) References Cited

U.S. PATENT DOCUMENTS 9,105,190 B2    8/2015  Akiyama
9,393,960 B2    7/2016  Kodaira
(Continued)

FOREIGN PATENT DOCUMENTS

JP    2011-240816 A    12/2011
JP    2018-062197 A     4/2018
(Continued)

*Primary Examiner* — Ramya P Burgess
*Assistant Examiner* — Ana D Thomas
(74) *Attorney, Agent, or Firm* — SoraIP, Inc.

(57) ABSTRACT

The control device according to the present disclosure is configured to execute, in a process of stopping a vehicle in an emergency, acquiring occupant information including information on at least one of a state or an attribute of an occupant of the vehicle, acquiring traveling environment information of the vehicle, calculating an in-vehicle risk indicating a risk of damage to the occupant when the vehicle is decelerated by the first braking control based on the occupant information, calculating an out-of-vehicle risk indicating a risk of damage caused by the vehicle based on the traveling environment information, braking the vehicle by the second braking control with less deceleration than the first braking control while the in-vehicle risk is higher than the out-of-vehicle risk, and braking the vehicle by the first braking control when the out-of-vehicle risk is higher than the in-vehicle risk.

4 Claims, 6 Drawing Sheets

(51) Int. Cl.
  *B60W 40/08* (2012.01)
  *B60W 60/00* (2020.01)
(58) Field of Classification Search
  CPC . G01S 2013/93271; G01S 2013/93272; G01S 2013/93274
  See application file for complete search history.

(56) References Cited

U.S. PATENT DOCUMENTS

| | | |
|---|---|---|
| 9,483,945 B2 | 11/2016 | Okita et al. |
| 9,873,412 B2 | 1/2018 | Moriizumi |
| 10,054,947 B2 | 8/2018 | Mays |
| 10,793,147 B2 | 10/2020 | Kaminade et al. |
| 2015/0243172 A1* | 8/2015 | Eskilson ................ H04L 67/12 701/1 |
| 2018/0170374 A1 | 6/2018 | Otsuka et al. |
| 2021/0061309 A1 | 3/2021 | Kawanai |
| 2021/0107521 A1 | 4/2021 | Fujita et al. |
| 2021/0107528 A1 | 4/2021 | Fujita et al. |
| 2021/0146956 A1 | 5/2021 | Fujita et al. |
| 2021/0146958 A1 | 5/2021 | Tanaka et al. |
| 2021/0155185 A1* | 5/2021 | Christensen ...... B60R 21/01554 |
| 2021/0163039 A1 | 6/2021 | Iwamoto et al. |

FOREIGN PATENT DOCUMENTS

| | | | |
|---|---|---|---|
| JP | 2020-164038 A | 10/2020 | |
| JP | 6803657 B2 | 12/2020 | |
| JP | 2021-084556 A | 6/2021 | |
| JP | 2022-030241 A | 2/2022 | |

\* cited by examiner

FIG. 2A

|  | | ATTRIBUTES | | | |
|---|---|---|---|---|---|
|  | | INFANTS AND THE ELDERLY | PRIORITY PERSON | GENERAL | UNAT-TENDED |
| STATE | SEATING AND SEATBELT | 4 | 3 | 1 | 0 |
| | SEATING (WITHOUT SEATBELT) | 6 | 4 | 2 | |
| | STANDING RIDE | 8 | 6 | 4 | |

FIG. 2B

| TYPE | NUMBER OF POINTS |
|---|---|
| TRAFFIC DRONE | 2 |
| MINOR CONTACT WITH SURROUNDING OBJECTS | 5 |
| PROPERTY DAMAGE | 7 |
| COLLISION WITH OTHER VEHICLES | 20 |
| HUMAN DAMAGE | 30 |

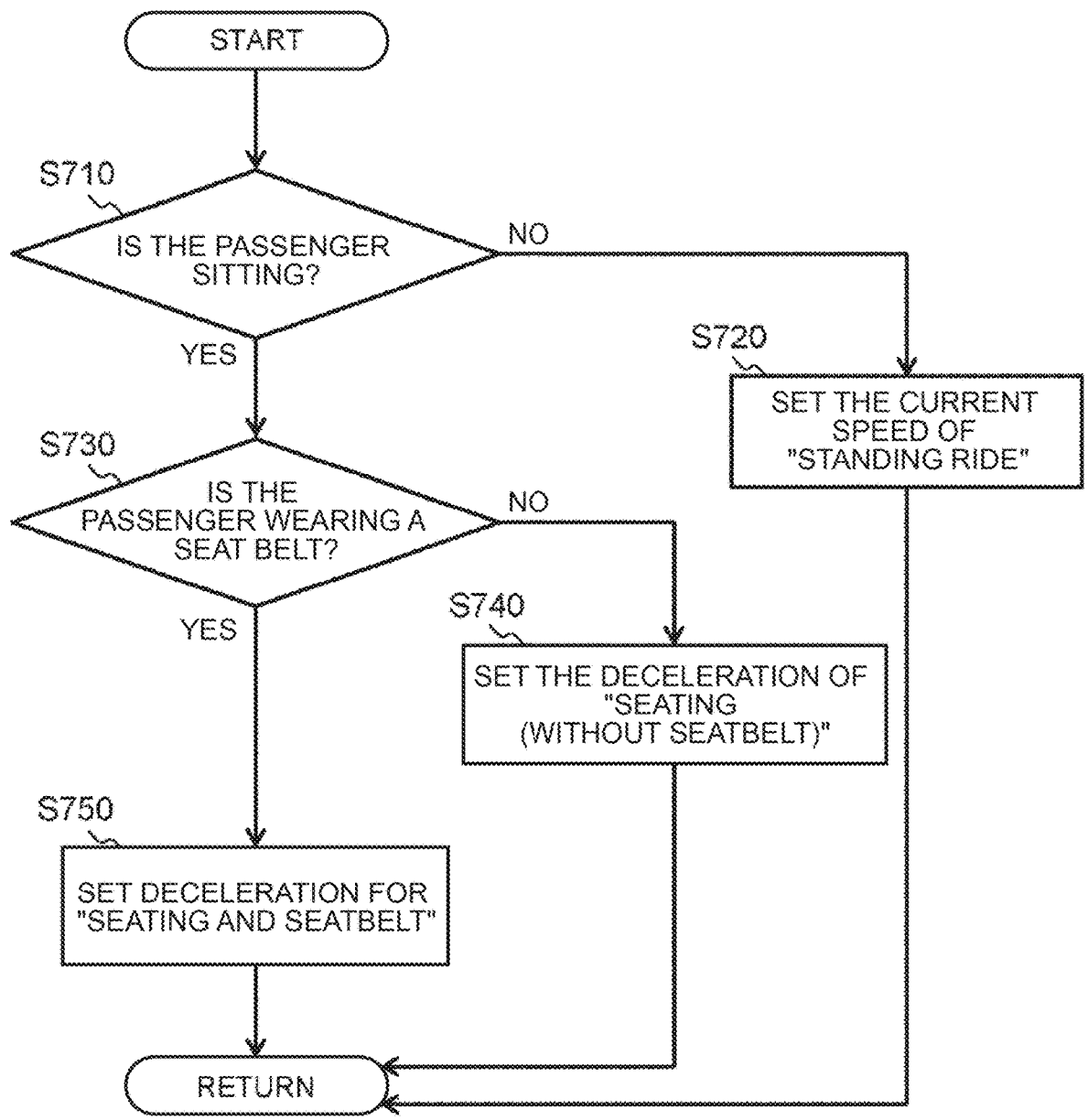

CONTROL DEVICE, CONTROL METHOD, AND STORAGE MEDIUM

CROSS-REFERENCE TO RELATED APPLICATION

This application claims priority to Japanese Patent Application No. 2022-179027 filed on Nov. 8, 2022, incorporated herein by reference in its entirety.

BACKGROUND

1. Technical Field

The present disclosure relates to control of a vehicle. In particular, the present disclosure relates to control for bringing the vehicle to an emergency stop when a predetermined condition is satisfied.

2. Description of Related Art

Japanese Unexamined Patent Application Publication No. 2018-062197 (JP 2018-062197 A) discloses a vehicle safety traveling system including a safety determination unit that detects a state of an occupant of a vehicle and determines safety against an impact on the occupant in a plurality of stages, and a travel control unit that applies a restriction corresponding to a stage of the safety to a traveling operation of acceleration/deceleration or steering. JP 2018-062197 A discloses that the travel control unit prioritizes execution of a collision avoidance operation over the restriction of the traveling operation.

SUMMARY

In the control of a vehicle such as an autonomous driving vehicle or a remote driving vehicle, when a situation occurs in which normal travel cannot be maintained, the vehicle is brought to an emergency stop.

Conventionally, in an emergency stop, the strong braking is applied to the vehicle such that the vehicle is brought to an emergency stop at an early stage in consideration of a surrounding traffic situation. In this case, high gravity (G) is applied to the inside of the vehicle. Therefore, there is a possibility that an occupant of the vehicle may be seriously damaged due to a fall or the like. On the other hand, depending on the surrounding traffic situation, it may not be necessary to bring the vehicle to a stop state at an early stage.

By applying the technique disclosed in JP 2018-062197 A, the traveling operation is restricted in accordance with the stage of the safety against the impact on the occupant. However, since the execution of the collision avoidance operation is prioritized, even in a case where the vehicle does not need to be stopped at an early stage, the strong braking is still applied to the vehicle.

An object of the present disclosure is to provide a technique capable of reducing the damage caused by bringing the vehicle to an emergency stop, regarding the control for bringing the vehicle to an emergency stop, in view of the above issue.

A first disclosure relates to a control device of a vehicle.

The control device according to the first disclosure is configured to execute a process of bringing the vehicle to an emergency stop when a predetermined condition is satisfied.

The process of bringing the vehicle to an emergency stop includes acquiring occupant information including at least one of pieces of information about a state of an occupant of the vehicle and an attribute of the occupant of the vehicle, acquiring traveling environment information including at least information about a surrounding environment of the vehicle, calculating, based on the occupant information, an in-vehicle risk indicating a risk of damage to the occupant when the vehicle is decelerated by first braking control, calculating an out-of-vehicle risk indicating a risk of damage caused by the vehicle based on the traveling environment information, performing braking of the vehicle by second braking control that causes less deceleration than the first braking control while the in-vehicle risk is higher than the out-of-vehicle risk, and performing braking of the vehicle by the first braking control when the out-of-vehicle risk is higher than the in-vehicle risk.

A second disclosure relates to a control method of a vehicle.

The control method according to the second disclosure includes bringing the vehicle to an emergency stop when a predetermined condition is satisfied.

The process of bringing the vehicle to an emergency stop includes acquiring occupant information including at least one of pieces of information about a state of an occupant of the vehicle and an attribute of the occupant of the vehicle, acquiring traveling environment information including at least information about a surrounding environment of the vehicle, calculating, based on the occupant information, an in-vehicle risk indicating a risk of damage to the occupant when the vehicle is decelerated by first braking control, calculating an out-of-vehicle risk indicating a risk of damage caused by the vehicle based on the traveling environment information, performing braking of the vehicle by second braking control that causes less deceleration than the first braking control while the in-vehicle risk is higher than the out-of-vehicle risk, and performing braking of the vehicle by the first braking control when the out-of-vehicle risk is higher than the in-vehicle risk.

A third disclosure relates to a storage medium storing a control program for causing a computer to execute control of a vehicle.

The control program according to the third disclosure is configured to cause the computer to execute a process of bringing the vehicle to an emergency stop when a predetermined condition is satisfied.

The process of bringing the vehicle to an emergency stop includes acquiring occupant information including at least one of pieces of information about a state of an occupant of the vehicle and an attribute of the occupant of the vehicle, acquiring traveling environment information including at least information about a surrounding environment of the vehicle, calculating, based on the occupant information, an in-vehicle risk indicating a risk of damage to the occupant when the vehicle is decelerated by first braking control, calculating an out-of-vehicle risk indicating a risk of damage caused by the vehicle based on the traveling environment information, performing braking of the vehicle by second braking control that causes less deceleration than the first braking control while the in-vehicle risk is higher than the out-of-vehicle risk, and performing braking of the vehicle by the first braking control when the out-of-vehicle risk is higher than the in-vehicle risk.

According to the present disclosure, the braking of the vehicle is performed by second braking control that causes less deceleration than the first braking control while the in-vehicle risk is higher than the out-of-vehicle risk. The second braking control is expected to have a smaller impact on the occupant than the first braking control. Therefore, while the in-vehicle risk is higher than the out-of-vehicle risk, the braking of the vehicle can be performed with priority given to the reduction of the damage to the occupant. On the other hand, when the out-of-vehicle risk is higher than the in-vehicle risk, the braking of the vehicle can be performed with priority given to the reduction of the damage caused by the vehicle. As a result, it is possible to appropriately reduce the damage caused by bringing the vehicle to an emergency stop in accordance with the comparison between the in-vehicle risk and the out-of-vehicle risk.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2A is a diagram illustrating an example of a table for calculating an in-vehicle risk;

FIG. 2B is a diagram illustrating an example of a table for calculating an outside-vehicle risk;

FIG. 6 is a diagram illustrating an example of processing executed by the control device according to the present embodiment.

DETAILED DESCRIPTION OF EMBODIMENTS

Hereinafter, the present embodiment will be described with reference to the drawings.

1. Configuration

Figure 1:
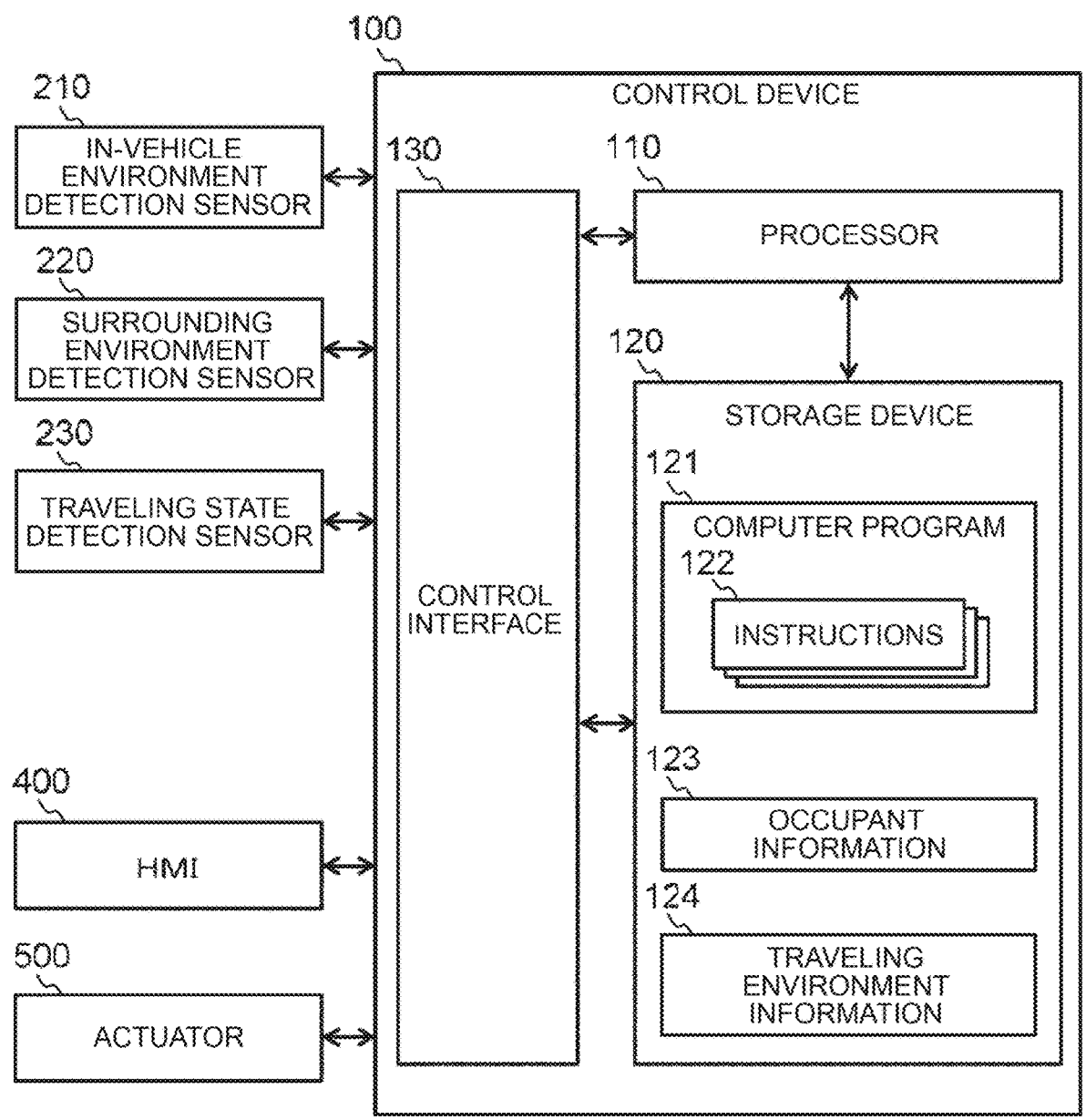
FIG. 1 is a block diagram for describing a configuration of a control device according to the present embodiment.

FIG. 1 is a block diagram for describing a configuration of a control device 100 according to the present embodiment. The control device 100 according to the present embodiment is a computer that is provided in a vehicle and executes processing related to control of the vehicle.

Here, an autonomous vehicle, a remote driving vehicle, or the like is exemplified as a vehicle including the control device 100 according to the present embodiment. When the vehicle is an autonomous driving vehicle, the control device 100 can be considered as a computer that executes processing related to the autonomous driving function. For example, the control device 100 controls the vehicle in accordance with a command acquired from an automated driving kit provided in the automated driving vehicle. When the vehicle is a remote driving vehicle, the control device 100 can be considered as a computer that executes processing related to the remote driving function. For example, the control device 100 controls the vehicle in accordance with a command received from a remote driving device connected to the remote driving vehicle. However, the control device 100 according to the present embodiment can also be applied to a more general vehicle.

In the following description, a "vehicle" refers to a vehicle that is provided with the control device 100 according to the present embodiment and is controlled by the control device 100 according to the present embodiment.

The control device 100 is communicably connected to the in-vehicle environment detection sensor 210, the surrounding environment detection sensor 220, the traveling state detection sensor 230, HMI 400, and the actuator 500. For example, the control device 100 is connected to these devices via an in-vehicle network configured by Control Area Network (CAN).

The in-vehicle environment detection sensor 210 detects an in-vehicle environment of the vehicle. In particular, the in-vehicle environment detection sensor 210 detects and outputs information (occupant information 123) on at least one of a state or an attribute of an occupant of the vehicle. Here, the state of the occupant is exemplified by whether the occupant is sitting or standing, whether the occupant is wearing a seat belt, and the like. Further, the attribute of the occupant can be given by a classification such as an infant, an elderly person, a priority person (a pregnant woman, a victim, a physically disabled person, or the like), and a general classification.

Examples of the in-vehicle environment detection sensor 210 include an in-vehicle camera, a seating sensor, and a seat belt sensor. The in-vehicle environment detection sensor 210 can be configured to detect the occupant information 123 by, for example, image recognition of an image captured by an in-vehicle camera. Further, the in-vehicle environment detection sensor 210 may be configured to detect the occupant information 123 by combining information on the detection state of the seating sensor and the detection state of the seat belt sensor.

The surrounding environment detection sensor 220 detects and outputs information on the surrounding environment of the vehicle (surrounding vehicle, pedestrian, surrounding object, lane, and the like). The surrounding environment information detected by the surrounding environment detection sensor 220 is one of information (traveling environment information 124) indicating the traveling environment of the vehicle. Examples of the surrounding environment detection sensor 220 include an outside-vehicle camera, a millimeter-wave radar, and a Light Detection and Ranging (LiDAR).

The traveling state detection sensor 230 detects and outputs information on a traveling state (vehicle speed, acceleration, yaw rate, and the like) of the vehicle. The traveling state information detected by the traveling state detection sensor 230 is one of the traveling environment information 124. Examples of the traveling state detection sensor 230 include a wheel speed sensor, an Inertial Measurement Unit (IMU), and the like.

HMI 400 provides Human Machine Interface (HMI) functionality. Examples of HMI 400 include a display, a speaker, a touch panel, and indicators.

The actuator 500 operates in accordance with a control signal acquired from the control device 100. Examples of the actuator 500 include an actuator that is related to the operation of a power device (an internal combustion engine, an electric motor, or the like), an actuator that is related to the operation of a brake mechanism, and an actuator that is related to the operation of a steering mechanism.

The control device 100 includes one or more processors 110 (hereinafter simply referred to as processors 110), one or more storage devices 120 (hereinafter simply referred to as storage devices 120), and a control interface 130. The processor 110 executes various processes and outputs a control signal. The processor 110 can be configured by, for example, a Central Processing Unit (CPU) including an arithmetic device, a register, and the like. The storage device 120 is coupled to the processor 110 and stores various kinds of information necessary for executing processing of the processor 110. The storage device 120 can be constituted by a recording medium such as Read Only Memory (ROM), Random Access Memory (RAM), Hard Disk Drive (HDD), Solid State Drive (SSD), and the like. The control interface 130 establishes a connection between the control device 100 and each device, and transmits and receives information to and from the processor 110 or the storage device 120. The control device 100 communicates with each device via the control interface 130.

The storage device 120 stores a computer program 121, occupant information 123, and traveling environment information 124.

The computer program 121 includes a plurality of instructions 122. The computer program 121 is configured to cause the processor 110 to execute various kinds of processing. That is, the processor 110 operates in accordance with the plurality of instructions 122 to implement various types of processing. The computer program 121 may be stored in a computer-readable recording medium.

The occupant information 123 is received from the in-vehicle environment detection sensor 210. The traveling environment information 124 is received from the surrounding environment detection sensor 220 and the traveling state detection sensor 230.

2. Processing

The control device 100 (more specifically, the processor 110) is configured to execute a process of stopping the vehicle in an emergency (hereinafter, simply referred to as an "emergency stop process") in response to the predetermined condition being satisfied. The predetermined condition is typically a condition indicating that the vehicle cannot maintain normal travel. For example, when the vehicle is an autonomous vehicle, a predetermined condition is that double communication with the autonomous driving kit is interrupted. Alternatively, when the vehicle is a remote driving vehicle, a predetermined condition is that communication with the remote driving device is interrupted. It should be noted that the predetermined condition may be suitably given in accordance with an environment to which the present embodiment is applied.

Emergency stop processing executed by the control device 100 will be described below.

First, the control device 100 calculates, based on the occupant information 123, a risk of damage to the occupant when the vehicle is decelerated by a predetermined braking control (hereinafter, referred to as "first braking control") (hereinafter, referred to as "in-vehicle risk"). Here, the first braking control is typically a control of applying braking to the vehicle so as to bring the vehicle into a stopped state at an early stage. In particular, the first braking control may be a conventional braking control for stopping the vehicle in an emergency. The damage suffered by the passenger is assumed to be caused by G applied to the inside of the vehicle due to deceleration of the vehicle. Examples of the damage to the passenger include injuries caused by falling and falling of the passenger, injuries caused by shock caused by deceleration, and deterioration of physical condition.

It is assumed that the in-vehicle risk is strongly influenced by the conditions and attributes of the passenger. For example, in a case where the occupant's condition is a standing ride, it is assumed that the in-vehicle risk is higher than that in a case where the occupant is seated. In addition, when the attribute of the occupant is an infant or an elderly person, it is assumed that the in-vehicle risk is higher than that in a general case.

Therefore, the control device 100 can be configured to calculate the in-vehicle risk according to the type of the passenger specified based on the occupant information 123. In the following, the calculation of the in-vehicle risk according to the type of the occupant will be described referring to FIG. 2A.

FIG. 2A is a table that defines the scores for the types of passengers. In FIG. 2A, the type of the occupant is a combination of a condition of the occupant and a property. The control device 100 can calculate the number of points defined for the type of the occupant as the in-vehicle risk by referring to the table shown in FIG. 2A. For example, when the type of the occupant is an elderly person who is standing on board, the control device 100 calculates an in-vehicle risk as 8. The table shown in FIG. 2A may be provided in advance as the computer program 121.

Next, the control device 100 calculates a risk of damage caused by the vehicle (hereinafter, referred to as an "out-of-vehicle risk") based on the traveling environment information 124. Examples of the type of damage caused by the vehicle include a traffic avalanche, a slight contact with a surrounding object, and a collision with another vehicle. Here, it is considered appropriate that the external risk when the damage caused by the vehicle is "collision with another vehicle" is considerably larger than the external risk when the damage caused by the vehicle is "traffic avalanche". In addition, the risk outside the vehicle is also an index of the possibility of occurrence of damage to the vehicle. For example, when the possibility of "minor contact with the surrounding object" is 10%, it is considered that the outside risk is not so large.

Therefore, the control device 100 calculates the possibility of occurrence of damage caused by the vehicle for each of a plurality of types based on the traveling environment information 124. A suitable known technique may be adopted for calculating the possibility of occurrence. For example, it is conceivable to calculate the possibility of occurrence of "traffic avalanche" or "slight contact with the surrounding object" from the relative distance with the surrounding object detected by the surrounding environment detection sensor 220 and the traveling state of the vehicle detected by the traveling state detection sensor 230. Then, the control device 100 can be configured to calculate the outside-vehicle risk based on the calculated occurrence probability for each of the plurality of types. Hereinafter, the calculation of the outside-vehicle-risk based on the possibility of occurrence of each of a plurality of types will be described referring to FIG. 2B.

FIG. 2B is a table that defines a score for each of a plurality of types of damage caused by vehicles. For example, the control device 100 can calculate the weighted sum of the scores for each of the plurality of types defined in the table shown in FIG. 2B as the out-of-vehicle risk by using the calculated possibility of occurrence for each of the plurality of types as the weight. For example, when the possibility of occurrence of "traffic avalanche" is 80% and the possibility of occurrence of "minor contact with surrounding objects" is 60%, the control device 100 calculates the outside risk as 2×0.8+5×0.6=4.6. Alternatively, the control device 100 may be configured to refer to the table shown in FIG. 2B and calculate the calculated score of the type having the highest possibility of occurrence as the out-of-vehicle-risk. The table shown in FIG. 2B may be provided in advance as the computer program 121. In addition, it is desirable that the score defined in the table is adapted with a reasonable score in relation to the above-described in-vehicle risk. That is, it is required that the validity of the comparison between the calculated in-vehicle risk and the outside-vehicle risk is ensured. The validity may be assured by analyzing past data and experimental data on changes in the surrounding traffic conditions due to emergency braking and the conditions of passengers.

Next, the control device 100 starts braking the vehicle. Here, when the in-vehicle risk is higher than the out-of-vehicle risk, the control device 100 performs braking of the vehicle by braking control (hereinafter, referred to as "second braking control") that has less deceleration than the first braking control. As the second braking control, for example, preliminary slight braking is performed before the main braking for stopping the vehicle. Further, the second braking control may be configured to reduce the deceleration of the present braking more than the first braking control. On the other hand, when the outside risk is higher than the inside risk, the control device 100 performs braking of the vehicle by the first braking control.

The control device 100 generates and outputs a control signal corresponding to the first braking control or the second braking control by executing the emergency stop process. Then, the actuator 500 operates in accordance with the generated control signal, whereby the braking of the vehicle in accordance with the first braking control or the second braking control is realized. In addition, the control device 100 may generate and output a control signal for HMI 400 in order to notify the passenger of the urgent stop process. In this case, HMI 400 operates in accordance with the generated control signal, so that a notification (such as a display of a display or a sound from a speaker) to the occupant in accordance with the first braking control or the second braking control is realized.

Incidentally, even after the braking of the vehicle is started, it is assumed that the outside risk of the vehicle changes every moment depending on a change in the surrounding environment or a situation of braking of the vehicle. For this reason, the control device 100 may be configured to calculate the outside risk of the vehicle in a timely manner even after the braking of the vehicle is started. In this case, when the risk of the outside of the vehicle becomes higher than the risk of the inside of the vehicle after the start of the braking of the vehicle, the control device 100 may be configured to switch the second braking control to the first braking control to perform the braking of the vehicle.

As described above, the control device 100 performs braking of the vehicle by the second braking control in which the deceleration is less than the first braking control while the in-vehicle risk is higher than the out-of-vehicle risk. The second braking control is expected to have a smaller impact on the occupant than the first braking control. Therefore, according to the present embodiment, while the risk of the inside of the vehicle is higher than the risk of the outside of the vehicle, the braking of the vehicle can be performed with priority given to the reduction of the damage suffered by the occupant. On the other hand, when the risk of the outside of the vehicle is higher than the risk of the inside of the vehicle, the braking of the vehicle can be performed with priority given to the reduction of the damage caused by the vehicle. As a result, it is possible to appropriately reduce the damage caused by bringing the vehicle to an emergency stop in accordance with the comparison between the in-vehicle risk and the out-of-vehicle risk.

Further, in the second braking control, the control device 100 may be configured to decelerate the vehicle with a smaller deceleration as the risk of the inside of the vehicle is higher. For example, the control device 100 sets the minor braking of the second braking control and the deceleration of the main braking according to the specified type of the passenger. In this case, the control device 100 may be configured to set a smaller deceleration as the in-vehicle risk calculated for the type of the occupant is higher. With this configuration, in the second braking control, it is possible to perform braking of the vehicle in consideration of the height of the risk in the vehicle. As a result, it is possible to more appropriately reduce the damage suffered by the occupant.

Figure 3:
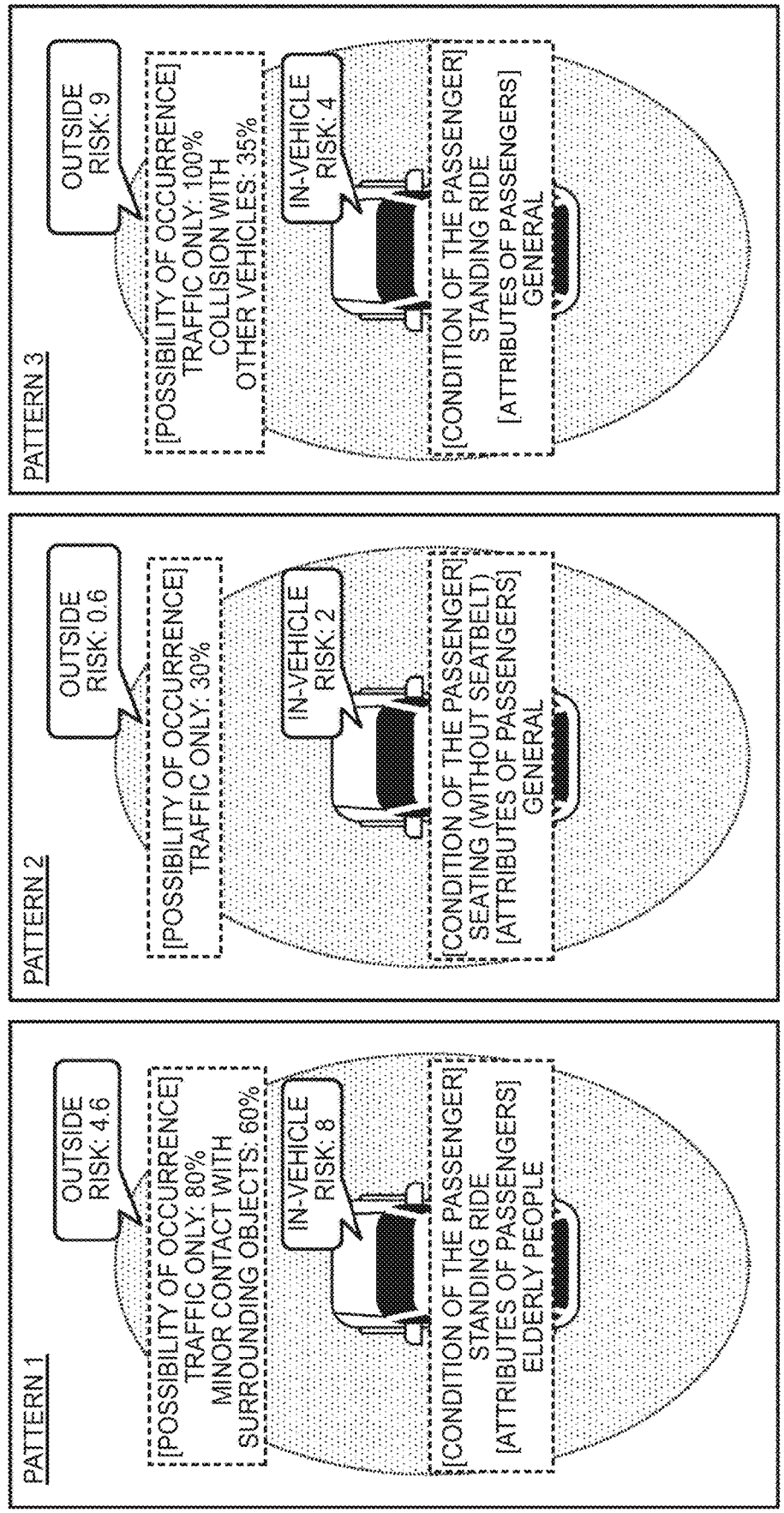
FIG. 3 is a conceptual diagram illustrating an example according to the present embodiment.
Figure 4:
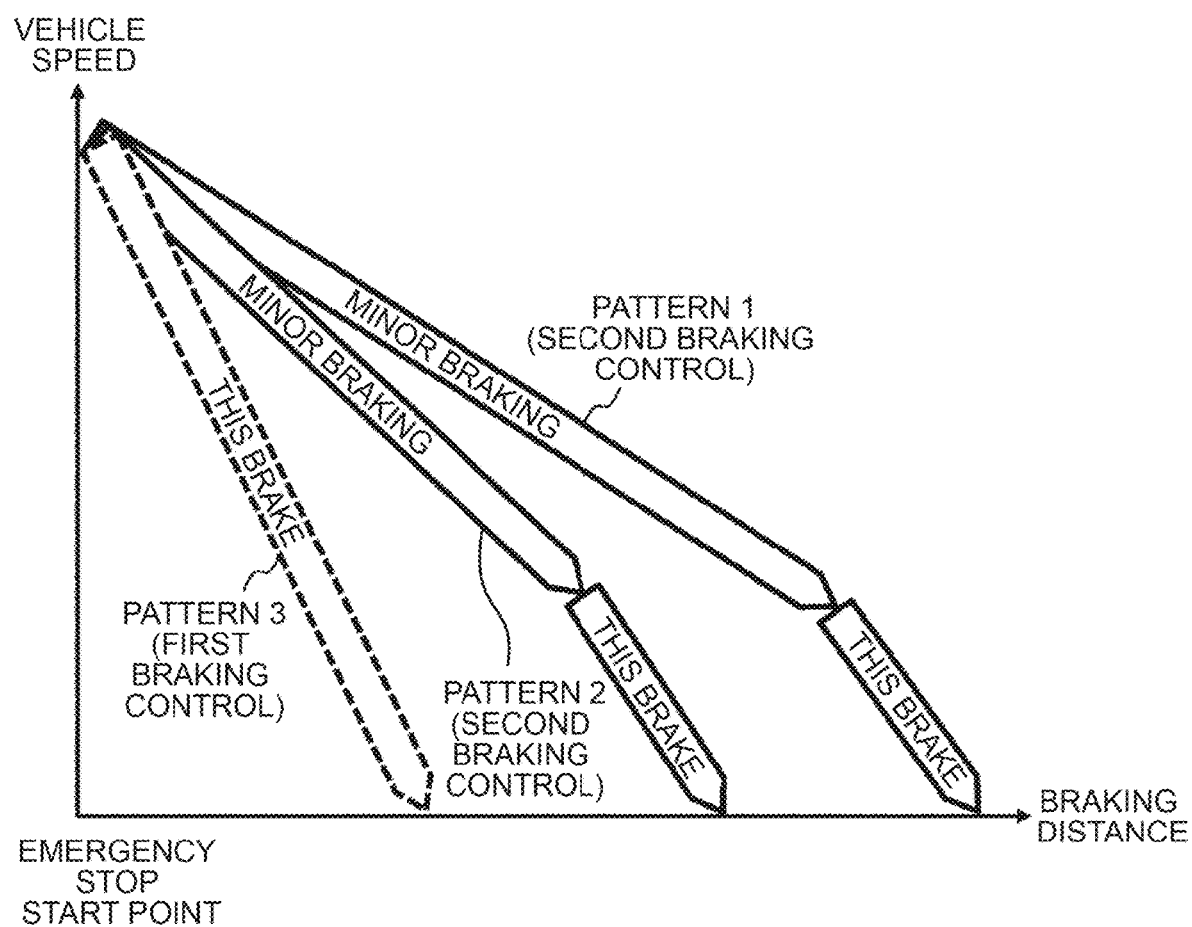
FIG. 4 is a conceptual diagram illustrating an example according to the present embodiment.

FIG. 3 and FIG. 4 show an embodiment of an emergency stop process executed by the control device 100. FIG. 3 shows three patterns in which the type of passenger and the possibility of occurrence of damage by the vehicle are different. In addition, in FIG. 3, the inside risk and the outside risk calculated for each of the three patterns are shown. Here, the inside risk and the outside risk shown in FIG. 3 are calculated based on the table shown in FIGS. 2A and 2B. FIG. 4 shows the state of the braking control and the change in the vehicle speed for each of the three patterns corresponding to the three patterns shown in FIG. 3.

As shown in FIG. 3, the pattern 1 and the pattern 2 have a higher inside risk than the outside risk, and the pattern 3 has a higher outside risk than the inside risk. Then, as shown in FIG. 4, in the pattern 1 and the pattern 2, braking of the vehicle is performed by the second braking control, and in the pattern 3, braking of the vehicle is performed by the first braking control. As a result, in the pattern 1 and the pattern 2, the change in the vehicle speed becomes gradual, and the impact received by the occupant can be reduced. Pattern 1 has a higher risk of the inside of the vehicle than pattern 2. As shown in FIG. 4, the pattern 1 has a smaller deceleration of the slight braking and the main braking than the pattern 2. As a result, the pattern 1 can further reduce the impact received by the occupant as compared with the pattern 2.

Figure 5:
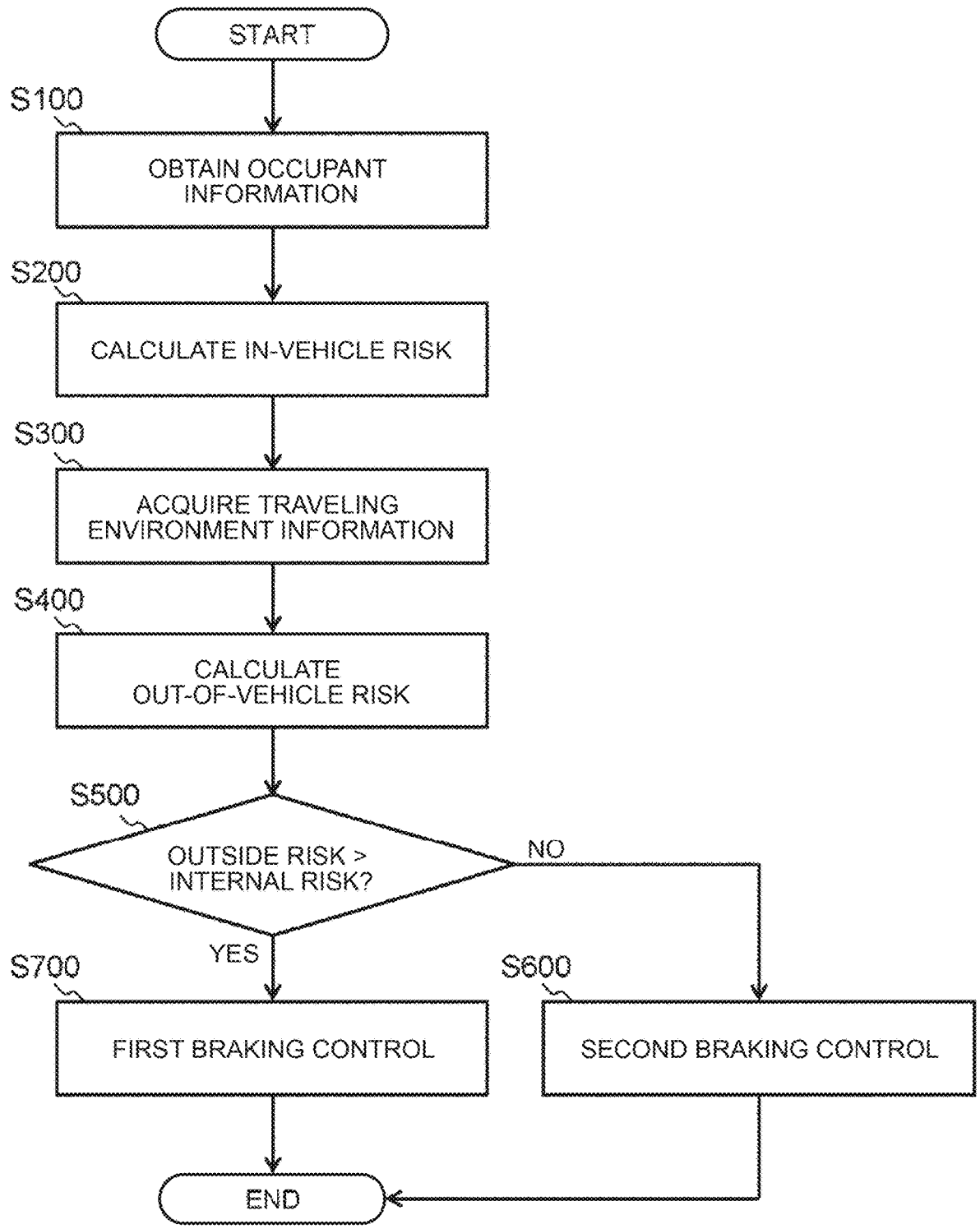
FIG. 5 is a diagram illustrating an example of processing executed by the control device according to the present embodiment.

FIG. 5 is a flowchart illustrating an example of processing executed by the processor 110 in the emergency stop processing. The flowchart illustrated in FIG. 5 starts when a predetermined condition is satisfied.

In S100, the processor 110 obtains occupant information 123. Thereafter, at S200, the processor 110 calculates an in-vehicle risk based on the occupant information 123.

In S300, the processor 110 obtains the traveling environment information 124. Then, in S400, the processor 110 calculates the outside-vehicle-risk based on the traveling environment information 124.

In S500, the processor 110 compares the in-vehicle risk calculated in S200 with the out-of-vehicle risk calculated in S400. When the in-vehicle risk is higher than the out-of-vehicle risk (S500; No), the processor 110 executes the second braking control (S600). When the outside risk is higher than the inside risk (S500; Yes), the processor 110 executes the first braking control (S700).

In this way, in the emergency stop processing, the processor 110 executes the processing. In addition, the processor 110 executes the processing as described above, thereby realizing the vehicle control method according to the present embodiment. Further, the control program according to the present embodiment is realized by configuring the computer program 121 that causes the processor 110 to execute processing in this way.

The processor 110 may be configured to execute (S600) the second braking control and then repeatedly execute the process related to S500 at a predetermined control cycle. The processor 110 may be configured to switch the second braking control to the first braking control and execute the first braking control when the outside risk is higher than the inside risk (S500; Yes).

FIG. 6 is a flowchart illustrating an example of processing executed by the processor 110 when the deceleration of the second braking control is set according to the type of the occupant. The flowchart illustrated in FIG. 6 is repeatedly executed at predetermined intervals, for example, when the second braking control is executed. In FIG. 6, the deceleration of "standing ride" is smaller than the deceleration of "seating (without seatbelt)". It is assumed that the deceleration of "seating (without seatbelt)" is less than the deceleration of "seating and seatbelt".

In S710, the processor 110 determines whether the occupant condition is seated. If the occupant's condition is not seated (S710; No), the processor 110 sets the deceleration of "standing ride" (S720). If the occupant is seated (S710; Yes), the process proceeds to S730.

In S730, the processor 110 determines whether the condition of the occupant is seatbelt wearing. When the condition of the occupant is S730; No, the processor 110 sets the deceleration of "sitting (seatbelt not worn)". If the occupant condition is seat belt wearing (S730; Yes), the processor 110 sets the deceleration of "seating and seat belt wearing".

By the processor 110 executing the processing in this way, it is possible to execute the second braking control so as to decelerate the vehicle with a smaller deceleration as the risk of the inside of the vehicle increases.

What is claimed is:

1. A control device of a vehicle, wherein:
   the control device is configured to execute a process of bringing the vehicle to an emergency stop in a case where a predetermined condition is satisfied; and
   the process of bringing the vehicle to an emergency stop includes
      acquiring occupant information including at least one of pieces of information about a state of an occupant of the vehicle and an attribute of the occupant of the vehicle,
      acquiring traveling environment information including at least information about a surrounding environment of the vehicle,
      calculating, based on the occupant information, an in-vehicle risk indicating a risk of damage to the occupant in a case where the vehicle is decelerated by first braking control,
      calculating an out-of-vehicle risk indicating a risk of damage caused by the vehicle based on the traveling environment information,
      performing braking of the vehicle by second braking control that causes less deceleration than the first braking control while the in-vehicle risk is higher than the out-of-vehicle risk, and
      performing braking of the vehicle by the first braking control in a case where the out-of-vehicle risk is higher than the in-vehicle risk, wherein
   the second braking control is configured to:
   determine whether the occupant is seated,
   in a case where the occupant is not seated, set the smaller deceleration to a first predetermined deceleration,
   in a case where the occupant is seated, determine whether the occupant is wearing a seatbelt,
   in a case where the occupant is not wearing the seatbelt, set the smaller deceleration to a second predetermined deceleration,
   in a case where the occupant is wearing the seatbelt, set the smaller deceleration to a third predetermined deceleration,
   wherein the first predetermined deceleration is smaller than the second predetermined deceleration, and the second predetermined deceleration is smaller than the third predetermined deceleration.

2. The control device according to claim 1, wherein:
   calculating the in-vehicle risk includes
      identifying a category of the occupant based on the occupant information, and
      calculating a predetermined score for the identified category of the occupant as the in-vehicle risk; and
   calculating the out-of-vehicle risk includes
      calculating a possibility of occurrence for each of multiple categories of the damage caused by the vehicle based on the traveling environment information, and
      calculating the out-of-vehicle risk based on a predetermined score for each of the categories and the calculated possibility of occurrence for each of the categories.

3. A control method of a vehicle, wherein:
   the control method includes bringing the vehicle to an emergency stop in a case where a predetermined condition is satisfied; and
   bringing the vehicle to an emergency stop includes
      acquiring occupant information including at least one of pieces of information about a state of an occupant of the vehicle and an attribute of the occupant of the vehicle,
      acquiring traveling environment information including at least information about a surrounding environment of the vehicle,
      calculating, based on the occupant information, an in-vehicle risk indicating a risk of damage to the occupant in a case where the vehicle is decelerated by first braking control,
      calculating an out-of-vehicle risk indicating a risk of damage caused by the vehicle based on the traveling environment information,
      performing braking of the vehicle by second braking control that causes less deceleration than the first braking control while the in-vehicle risk is higher than the out-of-vehicle risk, and
      performing braking of the vehicle by the first braking control in a case where the out-of-vehicle risk is higher than the in-vehicle risk, wherein the second braking control is configured to:
   determine whether the occupant is seated,
   in a case where the occupant is not seated, set the smaller deceleration to a first predetermined deceleration,
   in a case where the occupant is seated, determine whether the occupant is wearing a seatbelt, in a case where the occupant is not wearing the seatbelt, set the smaller deceleration to a second predetermined deceleration, in a case where the occupant is wearing the seatbelt, set the smaller deceleration to a third predetermined deceleration, wherein the first predetermined deceleration is smaller than the second predetermined deceleration, and the second predetermined deceleration is smaller than the third predetermined deceleration.

4. A non-transitory storage medium storing a control program for causing a computer to execute control of a vehicle, wherein:

the control program is configured to cause the computer to execute a process of bringing the vehicle to an emergency stop in a case where a predetermined condition is satisfied; and the process of bringing the vehicle to an emergency stop includes acquiring occupant information including at least one of pieces of information about a state of an occupant of the vehicle and an attribute of the occupant of the vehicle, acquiring traveling environment information including at least information about a surrounding environment of the vehicle, calculating, based on the occupant information, an in-vehicle risk indicating a risk of damage to the occupant in a case where the vehicle is decelerated by first braking control, calculating an out-of-vehicle risk indicating a risk of damage caused by the vehicle based on the traveling environment information, performing braking of the vehicle by second braking control that causes less deceleration than the first braking control while the in-vehicle risk is higher than the out-of-vehicle risk, and performing braking of the vehicle by the first braking control in a case where the out-of-vehicle risk is higher than the in-vehicle risk, wherein the second braking control is configured to:

determine whether the occupant is seated, in a case where the occupant is not seated, set the smaller deceleration to a first predetermined deceleration, in a case where the occupant is seated, determine whether the occupant is wearing a seatbelt, in a case where the occupant is not wearing the seatbelt, set the smaller deceleration to a second predetermined deceleration, in a case where the occupant is wearing the seatbelt, set the smaller deceleration to a third predetermined deceleration, wherein the first predetermined deceleration is smaller than the second predetermined deceleration, and the second predetermined deceleration is smaller than the third predetermined deceleration.

* * * * *